June 17, 1941.  O. L. McGRANN  2,246,102
TIRE INFLATING DEVICE
Filed March 15, 1939  2 Sheets-Sheet 1
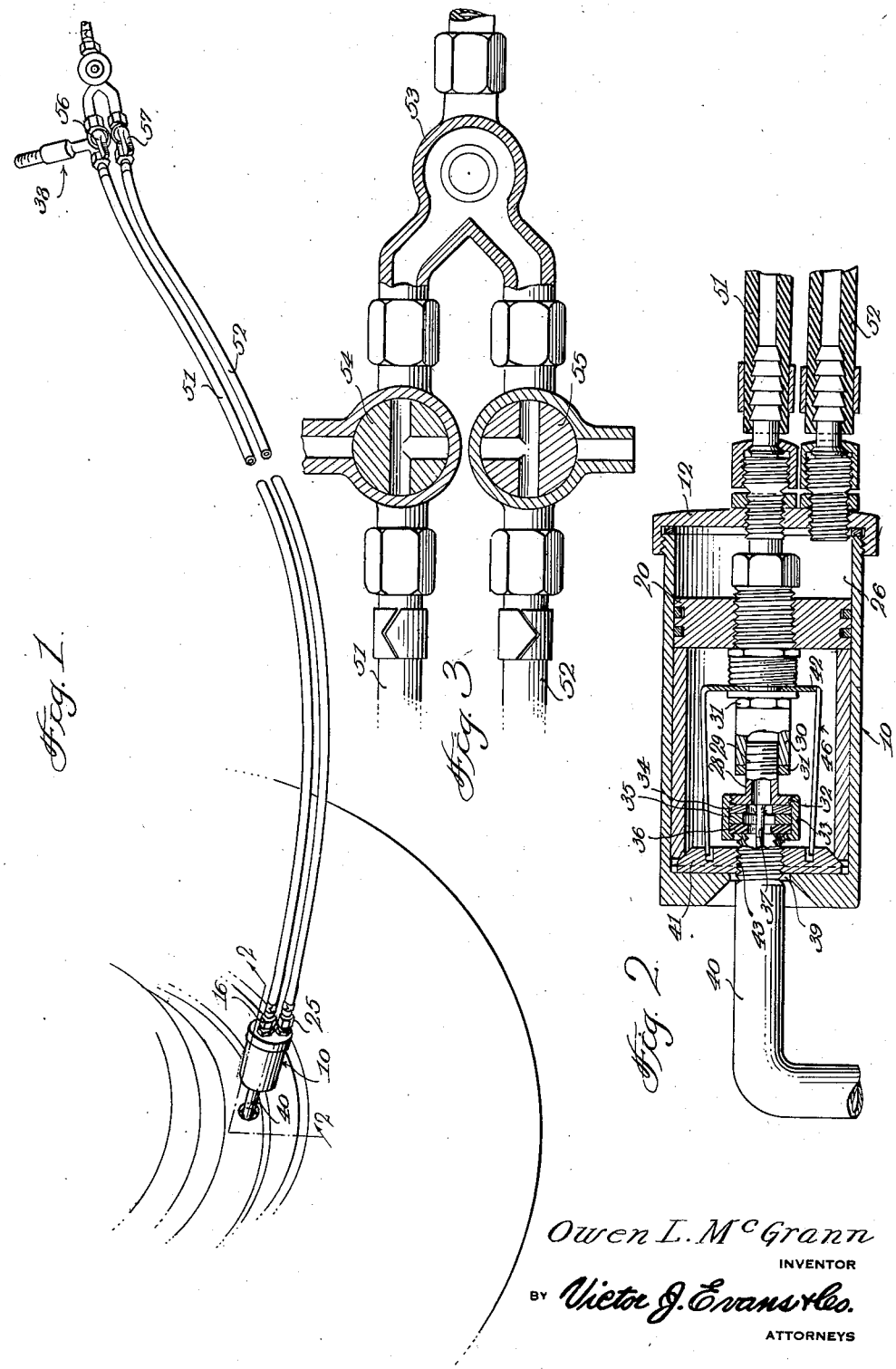
Owen L. McGrann
INVENTOR
BY Victor J. Evans & Co.
ATTORNEYS June 17, 1941.     O. L. McGRANN     2,246,102
TIRE INFLATING DEVICE
Filed March 15, 1939     2 Sheets-Sheet 2
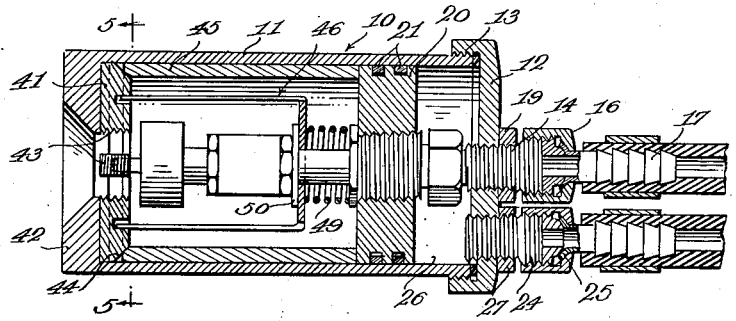
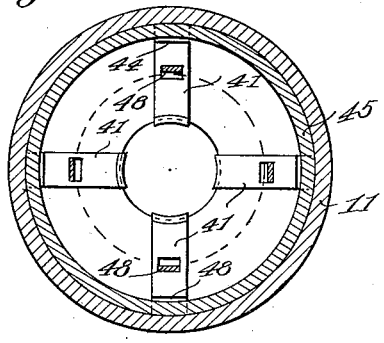
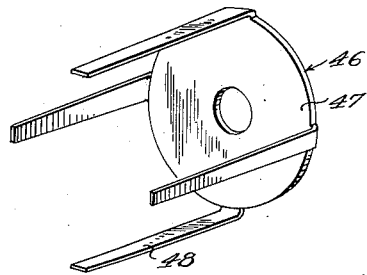
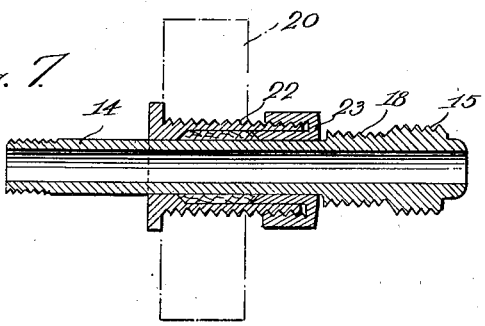
Owen L. McGrann
INVENTOR
BY Victor J. Evans & Co.
ATTORNEYS Patented June 17, 1941

2,246,102

UNITED STATES PATENT OFFICE 2,246,102

TIRE INFLATING DEVICE

Owen L. McGrann, Omaha, Nebr.

Application March 15, 1939, Serial No. 262,072

5 Claims. (Cl. 284—19)

The present invention relates to devices for inflating automobile tires and more particularly to an automatic means for locking such devices on the threaded portion of the tire tube valve stem while inflating the tire.

At the present time there is in use a number of devices known as automatic tire inflation gauges which simply record or indicate pressure in the tire at the time of inflating and the pressure to which the tire is to be filled. The automatic tire inflating gauges at present are used with what is known as an air chuck and which has to be held by hand in position on the tire tube valve stem while the tire is being filled with air.

The mechanic or other person who may be inflating a tire is thus placed in a lowered or kneeling position with the head and shoulders directly in line with the tire. In case the tire bursts under high pressure there is usually a resultant explosion and flying of parts which may seriously injure the person inflating the tire. Such automatic tire inflating gauges are at present manufactured with but one supply or air pressure line and with but one control valve for the purpose of inflating tires.

An important object of the invention is, therefore, the provision of an automatic tire inflating chuck in the use of which it is unnecessary for the operator to place the position of his body in line with the tire whereby high pressure tires may be inflated with the operator a reasonably safe distance from the same and while in the same position release the mechanism from the tire being filled.

Another object of the invention is to provide an air chuck including means for automatically locking the same on the threaded portion of the tire tube valve stem whereby the tire may be independently inflated to the pressure desired, and by releasing the pressure on a separate piston control valve, said chuck will be automatically released from the tire tube valve stem.

A still further object of the invention resides in the provision of a tire inflating chuck having the above characteristics that is constructed in a manner whereby one hand only is required for operating the same thus leaving the other hand free for manipulation of a flashlight or other purposes.

The invention will be fully and comprehensively understood from a consideration of the following detailed description when read in connection with the accompanying drawings which form a part of the application.

In the drawings:

Figure 1 is a perspective view of the device constructed in accordance with the present invention and being shown in use for inflating an automobile tire.

Figure 2 is a sectional view taken substantially on line 2—2 of Figure 1.

Figure 3 is a fragmentary sectional view, with parts in elevation of a type of valve connection which may be employed in the use of the device.

Figure 4 is a sectional view similar to Figure 2 but with the locking means shown in released position.

Figure 5 is a vertical sectional view taken substantially on line 5—5 of Figure 4.

Figure 6 is a perspective view of one detail of the locking means, and

Figure 7 is a transverse sectional view illustrating the manner of supporting a floating piston on the air inlet stem.

Referring to the drawings for a more detailed description thereof, the automatic tire inflating chuck generally indicated at 10 in the several views, includes a cylinder 11 formed of forged steel, brass or other suitable materials, substantially closed at one end by means of a cap 12 threaded thereto as indicated at 13. It is to be understood that the end of the tube supporting the cap 12 is the pressure end of the chuck and the opposite end is the open or non-pressure end which carries the means for placing the device on a tire tube valve stem.

The cap 12 is bored and threaded at the center for receiving the air supply tube 14, the construction of which is clearly illustrated in Figure 7 of the drawings. It will be noted that the exposed end of the tube is formed with an enlarged threaded portion 15 for receiving thereon a cap 16 carrying a conventional air union 17. The threaded portion 18 of the tube 14 is formed for receiving a nut 19 whereby said stem is locked to the cap 12. It will also be noted that the threaded portions of the extended end of the tube are substantially larger in diameter than any portion of the tube positioned within the cylinder which permits the tube to be freely inserted through the threaded opening formed in the cap 12.

In addition to supplying air for inflation of the tire, the tube 14 acts as a guide or piston rod for the loose or floating piston 20 which piston is grooved at its circumference for receiving packing rings 21 and tapped at its center for attachment with a conventional stuffing box generally indicated at 22. It will be noted, in Figure 7 of the drawings, that the stuffing box 22 includes a packing nut and gland 23 for creating an air-tight surface with the exterior portion of the tube 14 and, since the tube is also machined to the bore of the stuffing box, it will act as a guide for the loose or floating piston 20.

A threaded stem 24 having attached thereto an air union connection 25 is conveniently placed in the cylinder cap 12 and is connected through the union 25 with an air pressure line for providing air pressure in the end 26 of the cylinder for operating the floating piston 20, which in turn actuates the means for locking the device to the stem of the inner tube of the tire being inflated, which will be hereinafter more fully described. The stem 25 is also provided with a nut 27 for locking the same to the cap 12.

In the open or non-pressure end of the cylinder 11 there is disposed the chuck head including a stem 28, the inner end being exteriorly threaded at 29 and joined with the stem 14 through the medium of a coupling 30, the lock nuts 31 being employed on each end of said coupling for locking the same to the stems 14 and 28, respectively. The opposite end of the stem 28 is formed with a threaded flange portion 32 threadedly receiving a screw cap 33 for retaining the plate 34, spacing washer 35 and rubber disk 36, respectively, as clearly shown in Figure 2 of the drawings. The plate 34 has integral therewith a plunger 37 adapted to depress the spindle in the tire valve stem core allowing air to pass into the inner tube of the tire and also permitting pressure in the tire to pass outwardly for registering the pressure contained therein on an automatic tire gauge generally indicated at 38 in Figure 1 of the drawings. It will be noted that the non-pressure end of the cylinder is formed with a central opening 39 sufficiently large in diameter to accommodate the valve stem 40 and when positioning the air chuck for inflating the tire, the valve stem 40 will be inserted through the opening 39 until the end of the same contacts the rubber disk 35 at which time the plunger 37 will be in depressing contact with the tire valve stem core. This position is illustrated in Figure 2 of the drawings.

As afore indicated, means is provided for locking the cylinder 11 and its associated parts to the tire valve stem 40, the same being actuated by the floating piston 20. The locking means includes a plurality of equally spaced dogs 41, preferably four in number spaced 90° apart, and which are held by any desired means in slidable contact with the end 42 of the cylinder 11. One end of the dogs 41 is formed with threads 43 adapted for engagement with the threaded end of the tire valve stem 40, more clearly shown in Figure 2 of the drawings. As is to be understood, the dogs 41 are disposed vertically within the cylinder and the upper end thereof is bevelled at an angle of approximately 45° as indicated at 44 and has contact with a cylinder 45 frictionally held within the cylinder 11 and supported in abutting relation with the floating piston 20. A spring spider generally indicated at 46 is slidably mounted on the tube 14 and includes a backing plate 47 and arms 48 extending therefrom in spaced relation. The free ends of the arms 48 are disposed in notches 48' formed in the inner face of the dogs 41, said arms being preferably formed of spring steel or similar material for urging said dogs to normal position upon release of pressure on the piston 20. A coiled tension spring 49 is disposed about the stem 14 between the piston 20 and backing plate 47, said spring permitting the return of the backing plate and piston 20 to normal position upon the release of pressure on said piston. A collar 50 also mounted on the stem 14 forms a retaining means for the backing plate 47. Air under pressure is admitted into the pressure end 26 of the cylinder through the connection 24 and moves the piston 20 forwardly and simultaneously therewith urges the cylinder 45 against the bevelled ends of the dogs 41. The dogs are then moved downwardly into locking engagement with the tire valve stem thus placing a certain tension on the spring arms 48 as shown in Figure 2 of the drawings. The dogs 41 through the medium of the threads 43 will be locked on the valve stem so long as pressure is maintained in the end 26 of the cylinder. Upon release of pressure, the piston 20 will return to normal position assisted by the tension spring 49 and the upward flexing of the spring arms 48 will return the dogs 41 to their normal position, shown in Figure 4 of the drawings.

It is to be noted that the herein described invention necessitates the use of a pair of pressure lines independently operated and controlled. The pressure line 51 is connected with the union 16 for inflating the tire to the desired pressure and the second line 52 independently operated and controlled for the purpose of admitting air under pressure to operate the piston for locking the device on the tire tube valve stem while inflating the tires in the manner above described. The dual line is appropriately coupled from the source of supply as indicated at 53 and closely adjacent said coupling and preferably a safe distance from the cylinder 11, there is mounted in each line a control valve 54 and 55, respectively, of the rotary type actuated by handles 56 and 57, respectively. The conventional pressure indicating gauge 38 is coupled with the line 51 whereby an accurate reading of the pressure in the tire can be readily obtained. The position of the valves 54 and 55 illustrated in Figure 3 of the drawings, permits the admission of air through the lines 51 and 52, respectively. However, when desiring to test the pressure of the tire, the valve 54 is rotated 45° thus cutting off the supply of air for inflation purposes and permitting air to flow rearwardly through the line 51 to actuate the gauge 38. While reading the pressure on the gauge 38, the valve 55 is maintained in its position thereby maintaining the dogs 41 in locked position on the valve stem 40.

It is believed that the use and operation of the device is readily apparent from the above description taken in connection with the accompanying drawings. When desiring to inflate a tire the end 42 of the cylinder 11 is first disposed over the tire tube valve stem until contact is made with the chuck head including the rubber disk 36 at which time the plunger 37 will depress the spindle in the tire valve stem core. The valve 55 will then be opened through the medium of the handle 57 to permit admission of air through the line 52 and into the pressure end 26 of the cylinder 11 whereupon the piston 20 will be moved forwardly to position the dogs 41 into locking engagement with the threads of the valve stem 40. While maintaining this locked position, the valve 54 is rotated to admit air through the line 51 into the tire through the stems 14 and 28, respectively. To check the pressure of the air within the tire, the valve 54 is controlled whereby the pressure gauge 38 may be actuated in the manner above indicated and as soon as the required pressure has been obtained the valve 54 is cut off and the dogs released by also cutting off the supply of air through the valve 55.

It will thus be seen that it is only necessary for the mechanic or other person inflating the tire to be in close contact with the tire during the initial positioning of the cylinder 11 and while removing the same after the tire has been inflated to the required pressure. During the actual inflation of the tire the operator is stationed a remote distance therefrom and can conveniently control the admission of air through the pair of pressure lines by one hand only thus permitting the use of the other hand for holding a flashlight or other purposes. Also, when inflating a high pressure tire, and in the event that the casing of the same should burst under high pressure, the operator being at a safe distance from the same minimizes the possibility of injury from the force of the explosion and flying parts.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed is:

1. A device of the character described comprising, a cylinder, an air supply stem extending through said cylinder, a chuck head connectable with said supply stem and adapted for contact with a valve stem, one end of said supply stem projecting beyond said cylinder and having connection with an air pressure supply, means carried by said cylinder for locking the same on a valve stem, said means including vertically disposed spaced dogs, a piston slidably disposed on said supply stem, means interposed between said piston and said dogs for urging said dogs into locking engagement with said valve stem upon actuation of said piston, and spring means mounted on said stem for returning said dogs to normal position.

2. A device of the character described for attachment to the valve stem of a tire while inflating the same comprising, a cylinder having open and closed ends, a hollow stem extending transversely through said cylinder with one end thereof projecting beyond the closed end of said cylinder for attachment with an air hose, a chuck head mounted adjacent the open end of said cylinder and removably attached to said stem, said chuck head adapted to have contact with the valve stem, means carried by said cylinder for effecting locking engagement of the chuck head with the valve stem, said means including vertical dogs disposed in spaced relation adjacent the open end of said cylinder, a piston mounted within said cylinder and slidably disposed on said hollow stem, auxiliary pressure means attached to the closed end of said cylinder for actuating said piston, a disk mounted on said hollow stem between said piston and said dogs, said disk being formed with laterally extending fingers having engagement with said dogs, a cylindrical-shaped member frictionally held within said cylinder and disposed between said piston and said dogs, said cylindrical-shaped member adapted upon pressure being applied to said piston to urge said dogs downwardly into locking engagement with said valve stem and said laterally extending fingers adapted to return said dogs to unlocking position upon the release of pressure on said piston.

3. A device of the character described for attachment to the valve stem of a tire while inflating the same comprising, a cylinder having open and closed ends, a hollow stem extending transversely through said cylinder with one end thereof projecting beyond the closed end of said cylinder for attachment with an air hose, a chuck head mounted adjacent the open end of said cylinder and removably attached to said stem, said chuck head adapted to have contact with the valve stem, means carried by said cylinder for effecting locking engagement of the chuck head with the valve stem, said means including vertical dogs disposed in spaced relation adjacent the open end of said cylinder, a piston mounted within said cylinder and slidably disposed on said hollow stem, auxiliary pressure means attached to the closed end of said cylinder for actuating said piston, a disk mounted on said hollow stem between said piston and said dogs, said disk being formed with laterally extending fingers having engagement with said dogs, and means frictionally held within said cylinder and disposed between said piston and said dogs adapted upon pressure being supplied to said piston to urge said dogs downwardly into locking engagement with said valve stem, said laterally extending fingers adapted to return said dogs to unlocking position upon release of pressure on said piston.

4. A device of the class described comprising a cylinder, an air supply tube extending through said cylinder, one end of said tube having a chuck head attached thereto and the other end adapted to be connected with a pressure supply, means including vertically disposed spaced dogs for locking said cylinder on a valve stem, a pressure operated piston slidably mounted on said tube, and a cylindrical-shaped member frictionally held within said cylinder and disposed between said piston and said dogs adapted to urge said dogs downwardly into locking engagement with said valve stem upon actuation of said piston.

5. A device of the class described comprising a cylinder, an air supply tube extending through said cylinder, one end of said tube having a chuck head attached thereto and the other end adapted to be connected with a pressure supply, means including vertically disposed spaced dogs for locking said cylinder on a valve stem, a pressure operated piston slidably mounted on said tube, a cylindrical-shaped member frictionally held within said cylinder and disposed between said piston and said dogs adapted to urge said dogs downwardly into locking engagement with said valve stem upon actuation of said piston, and spring means carried by said tube having engagement with said dogs for returning said dogs to position out of engagement with the valve stem upon the release of pressure on said piston.

OWEN L. McGRANN.